Nov. 29, 1938.    C. D. HAVEN    2,138,164

PROCESS AND APPARATUS FOR PRODUCING GLAZING UNITS

Original Filed Oct. 12, 1934    3 Sheets-Sheet 1

Inventor
CHARLES D. HAVEN.
By Frank Fraser
Attorney

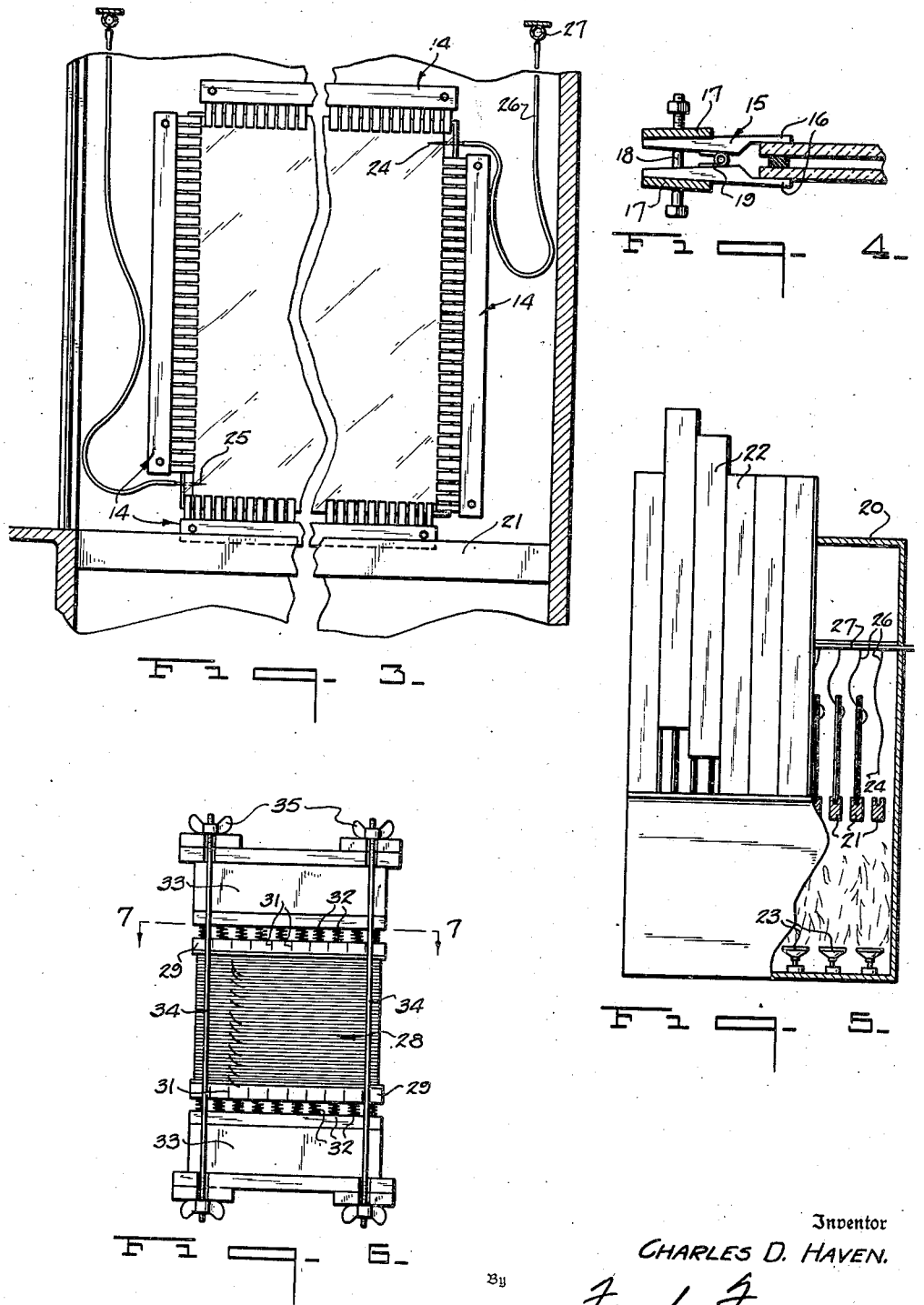

Nov. 29, 1938.　　　　C. D. HAVEN　　　　2,138,164
PROCESS AND APPARATUS FOR PRODUCING GLAZING UNITS
Original Filed Oct. 12, 1934　　3 Sheets-Sheet 3
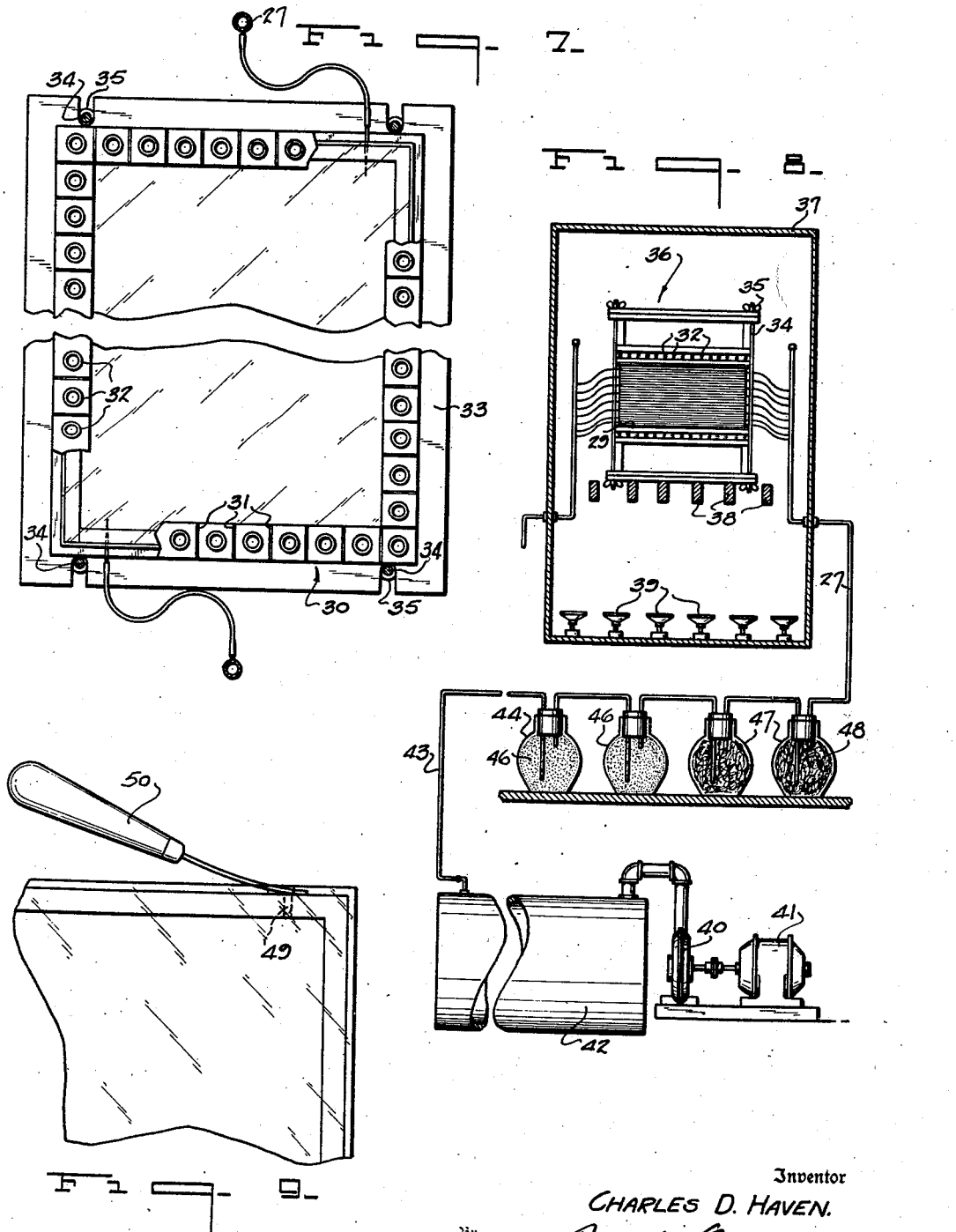
Inventor
CHARLES D. HAVEN.
By Frank Fraser
Attorney Patented Nov. 29, 1938

2,138,164

UNITED STATES PATENT OFFICE 2,138,164

PROCESS AND APPARATUS FOR PRODUCING GLAZING UNITS

Charles D. Haven, Toledo, Ohio, assignor to Thermopane Company, Toledo, Ohio, a corporation of Ohio Original application October 12, 1934, Serial No. 748,109. Divided and this application December 7, 1935, Serial No. 53,401

8 Claims. (Cl. 154—28)

The present invention relates to a single unit, multiple glass sheet glazing construction consisting of two or more sheets of glass spaced apart by separating means cemented between the sheets entirely around their edges with the space between the sheets being preferably filled with dehydrated air at normal atmospheric pressures.

Such a product has been manufactured and sold commercially by the Thermopane Company, assignee of the present application, under the trade name of "Thermopane", and throughout the application the word "Thermopane" will be understood to designate broadly a single unit, multiple glass sheet glazing construction of this character.

The instant application is a divisional of my application Serial No. 748,109, filed October 12, 1934.

The present divisional application is directed primarily to the process and apparatus used in the bonding of the glass sheets and separator together and the process and apparatus used in the dehydrating of the air contained in the space between the glass sheets and the separator strip as well as the adhesive.

As is pointed out in the parent application and in other divisional applications thereof, the broad idea of making a double sash glazing unit by cementing a spacer or separator strip about the perimeter of two sheets of glass to create an internal air space has been disclosed in a number of different prior art patents, some of which have already expired. However, so far as I am aware, none of these prior art suggestions have been commercially practical and my own attempts to produce satisfactory glass in accordance with the teachings of these prior art suggestions have resulted in utter failures.

In addition to proper cleaning of the glass prior to fabrication and selection of satisfactory adhesive strips and adhesives for use between the glass and strips, it is highly important that the glass and separator strips be properly pressed together and that the air space be thoroughly dehydrated and the separator strips super-dried so that they will not throw off volatile matter into the space permitting condensation upon the glass and other objectionable results.

Broadly speaking, the process and apparatus used for applying pressure, which is preferably accompanied by heat, embodies the clamping of the assembled glass and separator strips under spring tension to provide a flexible, constant and substantially evenly distributed pressure about the marginal portions of the assembly so that the pressure is, in effect, edge pressure and not pressure applied over the entire area of the glass sheets. The assembly is subjected to this compensating pressure for a period of time, and simultaneously with the heat and pressure treatment, dehydrated air is passed through the space between the glass sheets to insure removal of all moisture and other volatile matter from the space and separator strips whereby to prevent condensation within the Thermopane unit when the same is in use.

Other objects and advantages of the invention will become more apparent during the course of the following description when taken in connection with the accompanying drawings.

In the drawings wherein like numerals are employed to designate like parts throughout the same, Fig. 1 is a perspective view of a finished sheet of Thermopane;

Fig. 3 is an elevation showing a Thermopane assembly with pressing means arranged around the marginal portions thereof, Fig. 4 is a fragmentary sectional detail view thereof, Fig. 5 is an elevation, partly in section, of a heating chamber that may be used and showing a group of fabricated glass assemblies being subjected to pressure and dehydrating treatment;

Fig. 6 is an end elevation of a platen press type pressing means;

Fig. 7 is a section taken on line 7—7 in Fig. 6;

Fig. 8 is a diagrammatic view showing the pressing compartment and dehydrating equipment; and Fig. 9 is a detail view showing plugging of the openings provided in the separator strips to permit passage of dehydrated air through the space between the glass sheets during the heating and pressing treatment.

Figure 1:
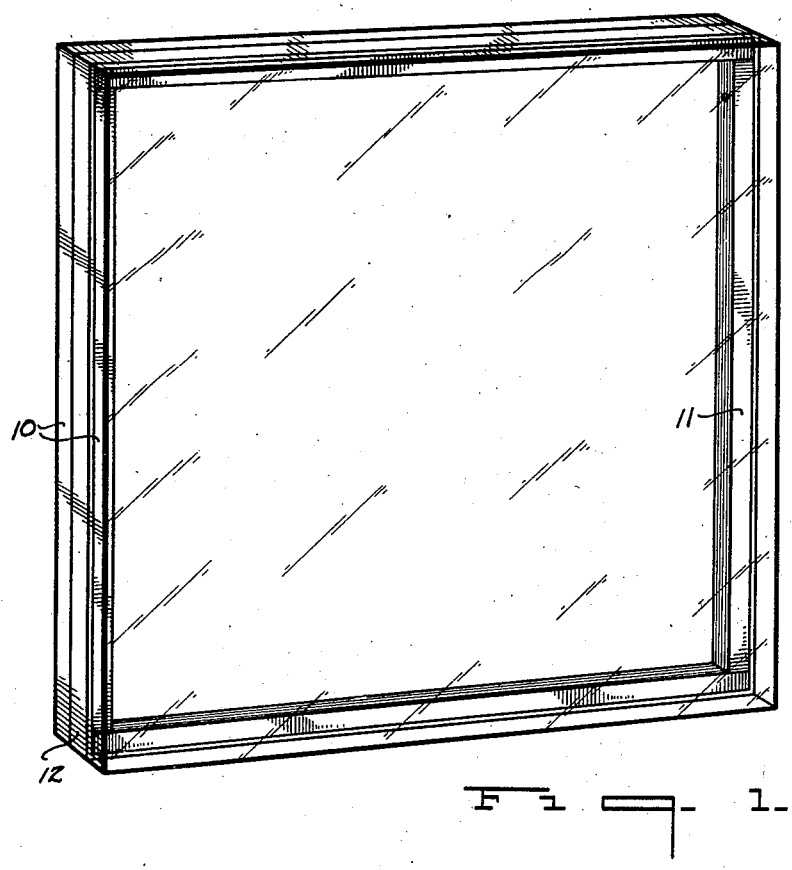

In Fig. 1 is shown a finished sheet of Thermopane comprising two sheets of glass 10 held in spaced relation by the separator strips 11 arranged entirely about the marginal portions of the glass sheets. The length of the separator strips is such that when properly positioned between the glass, a slight channel is created adapted to receive a seal 12 composed preferably of a number of coatings or layers of material designed to effectively protect the spacer strips and bond between the spacer strips and glass from the atmosphere and other elements, to which the glass may be subjected when in use, for preserving the predetermined conditions established within the structure at time of manufacture.

Figure 2:
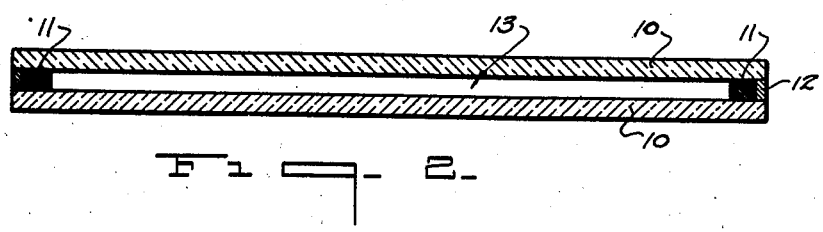
Fig. 2 is a vertical transverse section through a sheet of Thermopane.

As is shown more clearly in Fig. 2, the sheets of glass and spacer strips create the space 13 which preferably contains dehydrated air at substantially normal atmospheric pressure. Obviously, for special installations, the pressure of the dehydrated air within the space 13 may be varied one way or the other to meet particular conditions.

As is pointed out in the parent application, it is highly important that prior to fabrication of the glass into Thermopane, it be thoroughly cleaned, not only from the appearance standpoint but from the standpoint of durability of Thermopane when in use. Briefly stated, cleaning of the glass is accomplished by first subjecting it to a water soaking treatment to remove water soluble and water removable substances that may be on the surfaces of the glass and to also remove water soluble alkalies present at the surfaces of the glass sheets. Sodium and calcium hydroxides are mentioned as being probably the main soluble alkalies washed from the surface of the glass, and it is my opinion that removal of these alkalies from the surfaces of the glass plays an important part in holding down or entirely preventing deleterious staining or efflorescence of the glass sheets when subsequently fabricated into Thermopane.

Following the water soaking treatment, the glass sheets are subjected to the action of a second fluid capable of dissolving greases and similar matter which is not readily attacked by water, and a mixture of alcohol and some non-glass cutting abrasive such as whiting (chalk) is satisfactory for this step in the cleaning process.

The glass sheets are then buffed to remove the cleaning materials and foreign matter to give a satisfactorily cleaned mirror-like surface.

The separator strips 11, as is disclosed in the parent application, are formed from a yieldable, somewhat porous material such as a laminated rubber compound and fabric, with the outer surfaces of the rubber laminations being faced with the fabric. The fabric facings of the strips are cleaned and roughened so that an interrupted or point contact type of adhesion can be obtained between the separator and glass sheets.

The type of material from which the spacer elements are formed and the method of bonding the same to the glass sheets are important for a number of different reasons. When the Thermopane is placed in use, it is ordinarily subjected to strains from internal pressure in the air space and from expansion and contraction of the two or more sheets of glass due to the fact that the temperature of the glass sheets is constantly changing with relation to one another. When a rigid type of separator is used, this movement of the glass sheets and change in pressure often results in a cracking of the glass so that even assuming that it is possible to obtain an adequate bond between a rigid type separator and the glass, the results obtained are not satisfactory because of breakage. In other words, if the bond is sufficient to hold the glass and separator together, the glass sheets will break and if the bond is not sufficient to hold the glass and rigid separator together, seepage is permitted so that in either event the glass is ruined.

With the laminated rubber and fabric separator strip, shellac and alcohol in the approximate proportions of one pound of shellac to four gallons of 180 proof alcohol are entirely satisfactory. After the adhesive has been applied to the separators, the separators and glass sheets may be assembled as disclosed in my parent application.

After the elements have been placed in proper superimposed relationship, the assembly is subjected to a heating and pressing treatment to effect bonding of the glass and separator strips together. Simultaneously with the heat and pressure treatment to effect bonding, dehydrated air is passed through the space between the glass sheets. In Figs. 3 and 4 is shown one form of pressing means which can be used to subject the marginal portions of the assembly to an evenly distributed pressure. The clamping devices, designated in their entirety by the numeral 14, are suitable for pressing one assembly at a time and comprise the multiplicity of spring-pressed devices 15 including the jaws 16 for engaging opposite sides of the Thermopane assembly near the edges thereof as is clearly shown in Fig. 4. A number of the spring-pressed devices 15 are carried by the plates 17 through which extend the adjustable bolts 18. In view of the position of the spring member 19, the jaws 16 are normally urged toward one another, thus exerting pressure upon the Thermopane assembly, and to spread the jaws 16 apart the plates 17 may be moved toward one another as will readily be understood.

It is convenient to make up the clamping devices 14 in lengths suitable for the different sizes of Thermopane units to be produced, and while the individual clamping units can be placed on the glass one at a time it is cheaper and generally more satisfactory to make them up into units as shown so that a group may be placed in position at one time. Furthermore, it is not necessary that only one group of clamps be used on each side of the assembly as a number of lengths of units can be placed upon the glass provided there is a substantially uniform application of pressure about the perimeter of the Thermopane assembly.

After the clamping means have been associated with the assembly, it is placed into a cabinet or heating compartment 20 on the racks 21 arranged therein. The chamber 20 may be provided with a series of the supports 21 for receiving the spring-pressed Thermopane assemblies, and to permit access to the interior of the compartment the vertically adjustable closure members 22 can be used. As shown, the compartment is also provided with gas burners 23 for controlling the temperature of the compartment and consequently the Thermopane assembly during the pressing treatment. Obviously, the construction of the compartment can be varied to suit convenience and electrical as well as gaseous fuel heating elements will be satisfactory. Regardless of the form of heating equipment resorted to, the Thermopane assemblies should be subjected to a temperature of approximately 200° F. for a period of about three hours. The heat and pressure treatment thus applied is sufficient to promote an adequate and permanent bond between the glass sheets and separator strips as well as between the separator strips at their contacting portions. Naturally, the temperature and time cycle required will be dependent somewhat upon the composition of separator material and adhesive employed.

At the time the assemblies in the pressing means are placed in the cabinet 20, dehydrating means are connected with the space between the glass sheets. The hypodermic needles 24 and 25 are inserted through transverse openings previously formed in the separator strips. The needle 24 is connected by means of a flexible hose 26 to a conduit 27 furnished with a supply of dehydrated air, while the needle 25 serves as an exhaust for the space between the glass sheets, and in some cases the needle is not required as the opening will be satisfactory for exhausting purposes. However, by providing the needle and hose, there is less danger of clogging up of the opening in the separator strip during the dehydrating treatment.

In Figs. 6, 7 and 8 is shown another form of pressing means designed to give a constant and evenly distributed compensating pressure to the Thermopane assembly and differs from the clamping units of Figs. 3 and 4 in that a plurality of assemblies can be pressed simultaneously in one pressing means.

The structure of Figs. 6, 7 and 8 is in the nature of a compensating platen press in which the Thermopane assemblies 28 are placed one upon the other between the movable platens 29. As shown particularly in Fig. 7, the platens are provided with the strips 30 slotted at spaced points as at 31 to produce the isolated sections to act as retainers for the springs 32. The backing members 33 receive the other ends of the springs and by means of the rods 34 and wing nuts 35, the desired amount of pressure can be applied to the stack of Thermopane assemblies through the intermediary of the springs and compensating platens. It will be noted that the springs are positioned around the border portions of the platens only so that the pressure is an edge pressure and not applied over the entire areas of the glass sheets to the same extent.

In Fig. 8, the platen press, designated in its entirety by the numeral 36, is arranged within the cabinet 37 corresponding to the cabinet 20 in Fig. 5, the press and its contents being supported on the members 38 and the temperature of the glass controlled by the heating elements 39.

Regardless of the type of pressing instrumentality used, the dehydrating means are employed and the supply of dehydrated air may be furnished by means of the compressor 40 operated by the motor 41 and filling the tank 42. In addition to dehydrating the air, it is preferably filtered so that it is thoroughly cleaned when introduced into the cavity between the glass sheets. The pipe 43, connected to the tank 42, likewise connects to a jar 44 which may be filled with a dehydrating agent such as calcium chloride 45. One or any number of similar interconnecting jars may be used to insure thorough dehydration of the air. In the illustration, the jar 46 is likewise filled with calcium chloride. The remaining jars 47, shown in Fig. 8, may be filled with cotton and steel wool 48 so that the air is then completely dehydrated and filtered. It is then passed through the conduit 27 through the hypodermic needles and into the space between the glass sheets, and I prefer to use just sufficient pressure to insure a constant steady flow of air through the space; about one pound of pressure will do.

Because the assemblies are positioned in the heated cabinet for a period of about three hours, I have not found it necessary to heat the dehydrated air externally of the cabinet as its temperature is raised sufficiently passing through the conduits and while in the cavity between the glass sheets. However, the air may be heated externally of the cabinet if preferred and as a matter of precaution. During the entire time that the Thermopane assembly is being subjected to the heat and pressure treatment, a continuous stream of dehydrated air is passed through the space between the glass sheets.

Since all materials contain water in some degree, the term dehydration is a relative one. As has been pointed out, solid separators are not satisfactory, and therefore a type of separator having a slight degree of flexibility is employed and in the case of the rubber fabric laminated type of separator, the separator has a certain degree of porosity and thus capable of absorbing and holding moisture.

I have found that I can take advantage of this property of the separator and can make it serve a very useful function in the success of the Thermopane construction. During the heating and dehydrating steps, the degree of heat and length of time during which the treatment extends is high enough and long enough to give what I consider to be a super-drying of the separator material and the adhesive. That is, the heating of the assembly drives off volatile matter such as, for example, the alcohol in the adhesive and also moisture present in the separator. The passage of dehydrated air through the space formed between the glass sheets and in contact with the separators renders the separators hygroscopic and therefore they act as a safeguard when the Thermopane is in use because any slight moisture that might possibly be entrapped within the Thermopane is taken up by the super-dried separator and thus not permitted to condense on the surfaces of the glass when subjected to low temperatures.

The degree of dehydration required is high especially where the Thermopane is to be mounted in steel sash. When installed in metal sash, the muntins of the sash become very hot in summer, so that the separator must be dry enough that this heat will not drive out any moisture therefrom causing condensation to form on the glass surfaces. The muntins absorb the radiant heat from the sun while the glass transmits most of the radiant heat. This temperature difference will result in condensation if there is enough moisture present in the strip material or in the air trapped between the glass sheets.

Therefore, by super-drying the separator, a hygroscopic condition is produced whereby the separator itself acts as a constant means for keeping the air in a dehydrated condition so that a slight seepage of moisture which might possibly pass through the sealing coatings can be tolerated.

The importance of this super-drying of the separators to render them hygroscopic in nature cannot be over-emphasized, especially when it is considered that the volume of air in the space is so small that only a trace of moisture can be held in the air without reaching saturation. The volume of moisture which the rubber type separator can hold when properly dried is far greater than the capacity of the air itself to hold moisture so that a definite protection against free moisture in the air is had for a considerable length of time.

At the end of the heating and dehydrating treatments, the bonded glass and separator assembly are removed, and within a reasonably short time the openings provided for the insertion of the hypodermic needles are plugged with a suitable rubber cement 49 by means of the tool 50 as shown in Fig. 9.

Following this, the marginal portions of the

Thermopane are sealed and preferably this is done as disclosed in the parent application.

I claim:

1. The process of producing a multi-ply glass sheet glazing unit of the character described, comprising a plurality of glass sheets and yieldable separator strips bonded between the glass sheets entirely around their marginal portions, including the steps of applying a coating of adhesive to opposite surfaces of the separator strips, placing the glass sheets and separator strips in proper superimposed relationship with the adhesive coated surfaces of said separator strips in contact with the glass sheets, then subjecting the marginal portions of the assembly so formed to light pressure in presence of heat to bond the separator strips between the glass sheets, and passing dehydrated air through the space between the glass sheets during the pressing treatment.

2. The process of producing a multi-ply glass sheet glazing unit of the character described, comprising a plurality of glass sheets and yieldable separator strips bonded between the glass sheets entirely around their marginal portions, including the steps of applying a coating of adhesive to opposite surfaces of the separator strips, placing the glass sheets and separator strips in proper superimposed relationship with the adhesive coated surfaces of said separator strips in contact with the glass sheets, subjecting the marginal portions of the assembly so formed to compensating pressure in a heated atmosphere for bonding the glass sheets and separator strips together, and simultaneously passing a flow of dehydrated air through the space between the sheets to dehydrate the air remaining between the sheets and the separator strips themselves.

3. The process of producing a multi-ply glass sheet glazing unit of the character described, comprising a plurality of glass sheets and yieldable separator strips bonded between the glass sheets entirely around their marginal portions, including the steps of applying a coating of adhesive to opposite surfaces of the separator strips, placing the glass sheets and separator strips in proper superimposed relationship with the adhesive coated surfaces of said separator strips in contact with the glass sheets, subjecting the marginal portions of the assembly so formed to compensating pressures in the presence of heat to effect bonding between the glass sheets and separator strips, and simultaneously passing a continuous flow of thoroughly dehydrated air through the space between the glass sheets.

4. Apparatus of the character described for use in the manufacture of multi-ply glass sheet glazing units, comprising a plurality of glass sheets and separator strips bonded between the glass sheets entirely around their perimeters forming a dead air space therebetween, consisting of means for exerting compensating pressure to the marginal portions of the assembled glass sheets and separator strips, and means for inducing a flow of dehydrated air through said dead air space during the time that pressure is applied to the marginal portions of the assembly.

5. Apparatus of the character described for use in the manufacture of multi-ply glass sheet glazing units, comprising a plurality of glass sheets and separator strips bonded between the glass sheets entirely around their perimeters forming a dead air space therebetween, consisting of spring-pressed members arranged to exert pressure upon the marginal portions of the assembly to effect bonding of the glass sheets and separator strips together, and means for inducing a flow of dehydrated air through the space between the glass sheets for dehydrating the air left between said sheets and for dehydrating the separator strips.

6. Apparatus of the character described for use in the manufacture of multi-ply glass sheet glazing units, comprising a plurality of glass sheets and separator strips bonded between the glass sheets entirely around their perimeters forming a dead air space therebetween, consisting of spring-pressed members arranged to exert pressure upon the marginal portions of the assembly to effect bonding of the glass sheets and separator strips together, means for inducing a flow of dehydrated air through the space between the glass sheets for dehydrating the air left between said sheets and for dehydrating the separator strips, and means for heating the assembly during the pressing treatment.

7. Apparatus of the character described for use in the manufacture of multi-ply glass sheet glazing units comprising a plurality of glass sheets and separator strips bonded between the glass sheets entirely around their perimeters forming a dead air space therebetween, consisting of means for exerting a compensating pressure to the marginal portions only of the assembled glass sheets and separator strips, and means for heating the assembly during the pressing treatment.

8. Apparatus of the character described for use in the manufacture of multi-ply glass sheet glazing units comprising a plurality of glass sheets and separator strips bonded between the glass sheets entirely around their perimeters forming a dead air space therebetween, consisting of spring-pressed members arranged to exert pressure upon the marginal portions only of the assembly to effect bonding of the glass sheets and separator strips together, and means for heating the assembly during the pressing treatment.

CHARLES D. HAVEN.